March 26, 1957     S. M. SHOBERT     2,786,793

METHOD OF FABRICATING GLASS ROD

Filed July 6, 1954

INVENTOR.
SAMUEL M. SHOBERT

BY George L. Guist

ATTORNEY 2,786,793

Patented Mar. 26, 1957

2,786,793

METHOD OF FABRICATING GLASS ROD

Samuel Merle Shobert, Walkerton, Ind.

Application July 6, 1954, Serial No. 441,467

8 Claims. (Cl. 154—91)

The present invention relates to a method of fabricating glass rod and more particularly to a method for producing glass reinforced plastic rod which is suitable for use in making fishing rods.

During recent years, glass reinforced plastic rods have come into widespread production and usage as fishing poles and numerous other commodities. Many problems have been encountered in fabricating the raw rod from which the finished commodities are produced, which include the elimination of void spaces and internal fractures which limit the field of use of the rod for very special applications. For example, a fishing pole made from this raw rod must be free from internal fractures and void spaces which if present cause the rod to break under flexure or to act abnormally when compared to the action of the usual bamboo fishing pole. For light weight fishing tackle, the exclusion of void spaces and fractures has been successfully accomplished by the use of the "continuous" process as disclosed and claimed in Meek application Ser. No. 153,562, filed April 3, 1950, now Patent No. 2,684,318. Light weight fishing poles are of relatively small diameter and are used for fresh water fishing, and are not suitable for deep sea fishing. In order to adapt glass rod for deep sea fishing, it is necessary to substantially increase the cross-sectional diameter of the raw rod from one-half inch (½") up to, for example, one and one-half inches (1½"). A popular size is three-quarters inch (¾") diameter.

This invention deals primarily with the process for making this larger section glass rod especially adapted for use in making deep sea fishing poles. Up to the present time, suitably large glass rod stock has been fabricated according to the well-known "batch" method which involves the use of metal tubes, there being one such metal tube for each rod that is made. In following this method, a bundle of glass threads are immersed in a liquid resin, and is thereafter pulled or drawn into a suitably long forming tube for curing. This tube is then usually placed in an oven for curing the resin. The cured bundle is thereafter withdrawn from the tube and may be formed into suitable cross-sectional shapes and sizes by the usual grinding techniques.

For some reason, rods produced by this batch or tube method almost always contain fractures or void spaces which seriously impair the utility. When these rods are used for making deep sea fishing poles, they are usually discolored or painted with opaque material to hide the fractures since the ultimate consumer seriously questions the utility of the rod if he can see the fractures. Without this opaque material, the fractures are visible since the finished rod is translucent.

While the opaque material hides the fractures, it does not remedy the relatively high rate of breakage.

It is this problem of eliminating fractures in large section glass rod to which the present invention is directed.

It is therefore an object of this invention to provide a method for producing relatively large section glass rod which is free from flaws such as void spaces and fractures.

It is another object of this invention to provide a process for fabricating glass rod which produces reliable, consistent and economical results.

It is still another object of this invention to provide a process for making glass rod which is the ultimate in simplicity and does not require the use of the aforementioned forming tubes or the like, and which may be carried through at room temperatures.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

With reference to the drawings, a plurality of glass threads of the type conventionally used in fabricating glass rod for fishing poles are suspended at the center from a suitable string or wire hook 10. These threads are preferably first arranged in a single, long bundle which is fastened intermediate the ends to the hook 10. The resulting bundle then resembles the shape of an inverted V having two depending legs or bundles of thread 12 and 14.

Figure 1:
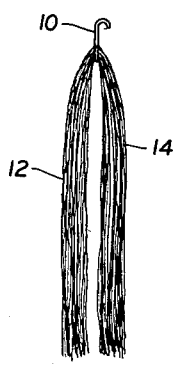
Fig. 1 illustrates the first step in the method of this process which is the bundling of a plurality of dry glass fibres together.
Figure 2:
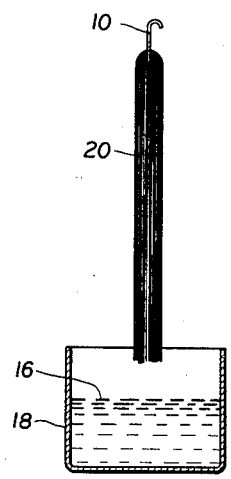
Fig. 2 illustrates a second step in the process which involves the impregnation of the glass threads with a suitable resin.
Figure 5:
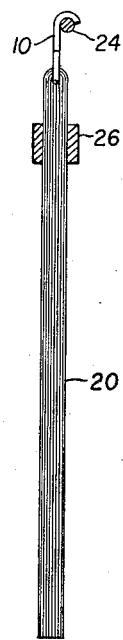
Fig. 5 illustrates one of the final steps in sizing the bundle and placing it in readiness for final cure.
Figure 4:
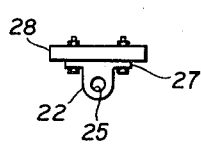
Fig. 4 is a plan view of one of the sizing dies of Fig. 3.

These bundles 12, 14 are next immersed in a bath of resin 16 (Fig. 2) which is conveniently kept in a suitable container 18. This immersion should be thorough so as to wet each and every thread of the bundle to achieve thorough impregnation and to exclude all traces of air. The resulting impregnated bundle 16 is withdrawn from the container 18 by elevating the supporting hook 10 as shown. In lifting the bundle 20 from a container 18, the hook 10 is passed through three suitable, vertically spaced sizing dies as shown, and the bundle 20 is drawn through these dies. Each die 22 is provided with an aperture 25 and suitable lugs 27 which may be secured to a vertical supporting plate or frame 28. The size of the aperture 25 is so selected that the threads of the bundle will be compacted together. A resultant compacted bundle is shown in Fig. 5 and indicated by the reference numeral 20. The diameter of this bundle is approximately equal to the size of the die aperture 25.

Figure 3:
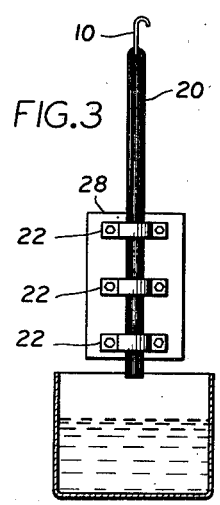
Fig. 3 shows a third step of drawing an impregnated bundle through a series of sizing dies.

After the bundle is drawn through the three dies 22 of Fig. 3, it is suspended from a suitable rod support 24 by means of the hook 10. A final sizing die 26 is telescoped over the upper end of the bundle 20 and thereafter allowed to gravitate downwardly until it falls off the bundle. This die 26 serves to straighten any wrinkles or unevenness out of the bundle and to place the bundle in condition for curing of the resin. The bundle is not touched after the die 26 falls therefrom until the resin is suitably cured and the bundle 20 becomes rigid. The resultant rod by reason of its being suspended from an overhead support is perfectly straight and free from any unusual deleterious bends or surface unevenness.

Final curing takes place in free air and no wrappings or tubes are applied to the bundle and, as a matter of fact, cannot be used in obtaining the unexpected beneficial results of this process.

The particular resin is a conventional type used in other well-known processes for making resilient glass rod products. Particularly, this resin comprises a liquid monomeric polyester, a peroxide such as methyl ethyl ketone peroxide or cyclohexanone peroxide, and cobalt naphthenate. The polyester resin is conventionally used in well-known methods of fabricating glass rods. A peroxide catalyst such as those mentioned and others are also conventionally used. The cobalt naphthenate is also conventionally used for initiating gelation and in propagating complete cure of the mixture at no greater than room temperature. Depending upon the concentrations of the various ingredients used, complete cure may take two days to two weeks to develop. Since a mixture of the cobalt naphthenate and the peroxide alone is explosively reactive, it is preferred to mix the polyester resin and the cobalt naphthenate first. This mixture is stable for a period of several months. A hydroperoxide catalyst, or those specific peroxides mentioned above, can then be added when ready for use. Bench or pot life of the resulting mixture will vary depending upon the type of peroxide material used and can be reduced to a period as short as thirty minutes when the peroxide is highly active. Curing of this mixture occurs at room temperature. Usual concentrations for use in this invention, depending upon the pot life desired, ranges from one-tenth (0.1%) to two-tenths (0.2%) percent of the cobalt naphthenate and approximately two percent (2%) of a peroxide such as cyclohexanone.

This resin material which cures at room temperatures, for example, seventy-seven degrees Fahrenheit (77° F.) is available on the open market and is currently used in making glass rod. Specific examples of suitable mixtures are found in the Technical Data Sheet of December 26, 1950 by the Pittsburgh Plate Glass Co. of Pittsburgh, Pa. Then same or similar materials are described in the Rohm & Haas Company's booklet of July, 1950 bearing the form number M-7-50 and entitled the Paraplex "P" Series Resins.

Prior to this invention, the resin mixture of the preceding paragraph was used to impregnate glass fibres which were formed into a suitably sized bundle by the use of metallic molds or tubes. After the resin cure, the bundle was withdrawn from the tube and thereafter processed or ground to size as desired. By following this tube method of forming the bundle, in almost every instance the resultant rod was filled with fractures or void spaces. Insofar as the industry was concerned, these fractures or void spaces in the final product were tolerated and deep sea fishing rods and the like were fabricated therefrom. No suitable solution to this problem of fracturing has, up to the date of this invention, been discovered.

In proving the superior results obtained by following the procedure of this invention, which makes no use of tubes or wrappings for the bundle while the latter is curing, direct comparison experiments have been run many times between the process of this invention and that of the prior art using forming tubes. All conditions were maintained the same with the exception that the bundle 20 of Fig. 5 was drawn into a tube to cure according to the prior art method while another bundle 20 was allowed to cure according to this invention. In every instance in which this comparison test was run, the bundle cured in the metallic tube contained many flaws and fractures while in not a single instance did the cured bundle of this invention contain a similar flaw or fracture. The discovery of the deleterious results of using cellophane wrappings or a metallic tube on the bundle while it cures therefore constitutes a material contribution to the art, especially in view of the fact that the resulting product is more perfect than that which has been achieved to date.

In brief summary, the method of this invention for fabricating glass rod is distinctive in that no wrapping or forming mold is used on the wet bundle of glass threads during the curing stage. Even though the wet bundle is peripherally unsupported during cure, it retains its shape and size.

What is claimed is:

1. The steps in the method of producing resilient glass rod comprising arranging a plurality of glass threads substantially parallel into a longitudinally extending bundle, wetting said bundle throughout with a liquid resin, gathering the wetted bundle into a self-supporting cross-sectional shape, suspending said bundle of self-supporting shape from one end, and curing said resin to bond said threads securely together while said bundle is suspended, said bundle being self-supporting in cross-sectional shape thereby requiring no externally applied holding means for retaining the cross-sectional bundle shape.

2. The steps in the method of producing resilient glass rod comprising arranging a plurality of glass threads substantially parallel into a longitudinally extending bundle, wetting said bundle throughout with a liquid resin, gathering the wetted bundle into a self-supporting cross-sectional shape, suspending said self-supporting bundle from one end, and curing said resin to bond said threads securely together while said bundle is suspended, said bundle having no externally applied holding means for retaining the cross-sectional bundle shape, said bundle being allowed to cure in open air.

3. The steps in the method of producing solid resilient glass rod of relatively heavy cross section comprising impregnating a longitudinal bundle of individual glass threads with a bonding resin in liquid form, said resin being curable at a given temperature, drawing said bundle through a die for shaping and sizing the bundle and also to compact said threads together to exclude all traces of air and void spaces, said bundle thereby being homogeneously composed of only resin and glass threads, suspending said bundle in self-supporting cross-sectional form from one end, and curing said resin for bonding said threads securely together without any shape-forming means on said bundle, said bundle being exposed to free atmosphere during the curing step.

4. The steps in the method of producing solid resilient glass rod of relatively heavy cross-section comprising impregnating a longitudinal bundle of individual glass threads with a bonding resin in liquid form, said resin being curable at a given temperature, drawing said bundle through a die for shaping and sizing the bundle and also to compact said threads together into a self-supporting cross-sectional shape to exclude all traces of air and void spaces, said bundle thereby being homogeneously composed of only resin and glass threads, suspending said self-supported bundle from one end, straightening said bundle while suspended, and curing said resin while said bundle is suspended for bonding said threads securely together without any shape-forming means on said bundle, said bundle being exposed to free atmosphere during the curing step.

5. The steps in the method of producing solid resilient glass rod of relatively heavy cross-section comprising impregnating a longitudinal bundle of individual glass threads with a bonding resin in liquid form, said resin being curable at a given temperature, drawing said bundle through a die for shaping and sizing the bundle and also to compact said threads together to exclude all traces of air and void spaces, said bundle thereby being homogeneously composed of only resin and glass threads, suspending said bundle from one end, straightening said bundle while suspended and curing said resin for bonding said threads securely together without any shape-forming means on said bundle, said bundle being exposed to free atmosphere during the curing step, said resin comprising a mixture of liquid monomeric polyester resin, said a catalyst for causing the mixture to polymerize at room temperatures.

6. The steps in the method of producing solid resilient glass rod of relatively heavy cross-section comprising impregnating a longitudinal bundle of individual glass threads with a bonding resin in liquid form, said resin being curable at a given temperature, drawing said bundle through a die for shaping and sizing the bundle and also to compact said threads together to exclude all traces of air and avoid spaces, said bundle thereby being homogeneously composed of only resin and glass threads, suspending said bundle from one end, and curing said bundle in open air, the bundle being self-supporting in shape during the curing step and having no externally applied holding means applied thereto whereby the surface thereof is directly exposed to the atmosphere.

7. The steps in the method of producing resilient glass rod comprising arranging a plurality of glass threads substantially parallel into a longitudinally extending bundle, wetting said bundle throughout with a liquid resin, said resin comprising a mixture of polyester resin, cobalt naphthenate and a peroxide catalyst, said cobalt naphthenate propagating complete cure of the resin at room temperature, gathering the wetted bundle into a self-supporting cross-sectional shape, suspending said bundle of self-supporting shape from one end, and curing said resin to bond said threads securely together while said bundle is suspended, said bundle being self-supporting in cross-sectional shape thereby requiring no externally applied holding means for retaining the cross-sectional bundle shape.

8. The steps in the method of producing resilient glass rod comprising arranging a plurality of glass threads substantially parallel into a longitudinally extending bundle, wetting said bundle throughout with a liquid resin, said resin comprising a mixture of polyester resin, cobalt naphthenate and a peroxide catalyst, the cobalt naphthenate ranging from one-tenth (0.1%) percent to two-tenths (0.2%) percent of the mixture and the peroxide catalyst constituting approximately two (2%) percent of the mixture, said cobalt naphthenate propagating complete cure of the resin at room temperature, gathering the wetted bundle into a self-supporting cross-sectional shape, suspending said bundle of self-supporting shape from one end, and curing said resin to bond said threads securely together while said bundle is suspended, said bundle being self-supporting in cross-sectional shape thereby requiring no externally applied holding means for retaining the cross sectional bundle shape.

References Cited in the file of this patent

UNITED STATES PATENTS

| | | |
|---|---|---|
| 2,311,704 | Simison | Feb. 23, 1943 |
| 2,558,855 | Knewstubb et al. | July 3, 1951 |
| 2,602,766 | Francis | July 8, 1952 |
| 2,625,498 | Koch | Jan. 13, 1953 |
| 2,653,887 | Slayter | Sept. 29, 1953 |
| 2,684,318 | Meek | July 20, 1954 |
| 2,751,320 | Jacobs et al. | June 19, 1956 |